United States Patent

Schmidt

(10) Patent No.: US 6,733,265 B1
(45) Date of Patent: May 11, 2004

(54) ELECTRIC PRECISION INJECTION UNIT

(75) Inventor: Holger Schmidt, Bad Frankenhausen (DE)

(73) Assignee: Demag Ergotech GmbH, Schwaig (DE)

( * ) Notice: Subject to any disclaimer, the term of this patent is extended or adjusted under 35 U.S.C. 154(b) by 11 days.

(21) Appl. No.: 10/070,085

(22) PCT Filed: Aug. 29, 2000

(86) PCT No.: PCT/DE00/02996

§ 371 (c)(1),
(2), (4) Date: Mar. 4, 2002

(87) PCT Pub. No.: WO01/17746

PCT Pub. Date: Mar. 15, 2001

(30) Foreign Application Priority Data

Sep. 8, 1999 (DE) .......................................... 199 43 709

(51) Int. Cl.⁷ ............................................. B29C 45/77
(52) U.S. Cl. ........................ 425/145; 425/574; 425/576
(58) Field of Search ................................ 425/145, 152, 425/574, 567

(56) References Cited

U.S. PATENT DOCUMENTS

| 4,741,685 | A | * | 5/1988 | Inaba et al. .................. 425/145 |
| 5,129,808 | A | | 7/1992 | Watanabe et al. |
| 5,338,174 | A | * | 8/1994 | Miese et al. .................. 425/150 |
| 5,540,495 | A | * | 7/1996 | Pickel ........................ 425/145 |
| 6,059,556 | A | | 5/2000 | Koike et al. |
| 6,443,722 | B1 | * | 9/2002 | Castelli et al. ............... 425/145 |
| 6,461,139 | B1 | * | 10/2002 | Yokoya et al. ............... 425/150 |
| 6,517,336 | B1 | * | 2/2003 | Emoto et al. ................ 425/145 |
| 6,562,261 | B2 | * | 5/2003 | Onishi ........................ 425/145 |
| 2002/0076465 | A1 | * | 6/2002 | Knauff et al. ................ 425/567 |
| 2002/0119211 | A1 | * | 8/2002 | Bleier et al. ................. 425/145 |

FOREIGN PATENT DOCUMENTS

| DE | 42 06 966 | 11/1992 |
| DE | 43 44 335 | 6/1995 |
| DE | 44 09 822 | 8/1995 |

OTHER PUBLICATIONS

Patent Abstracts of Japan, vol. 016, No. 274, JP 04067928, Mar. 1992.
Patent Abstracts of Japan, vol. 011, No. 125, JP 61266218, Nov. 1986.
Patent Abstract of Japan, vol. 013, No. 593, JP 01249419, Apr. 1989.

* cited by examiner

Primary Examiner—Tim Heitbrink
(74) Attorney, Agent, or Firm—Cohen, Pontani, Lieberman & Pavane

(57) ABSTRACT

An injection molding device with an injection molding cylinder in which is arranged a coaxial worn that is rotatable and axially displaceable by drive devices. A spindle nut rotatable by a first drive device is mounted in a housing and cooperates with a screw sleeve which is axially displaceable during rotation of the spindle nut but is fixed against rotation during axial displacement. Further, a shaft is mounted in the interior of the screw sleeve and is connected at one end to the worm and has at the other end an axial coupling, one of whose coupling parts communicates with a second drive device.

5 Claims, 2 Drawing Sheets

ELECTRIC PRECISION INJECTION UNIT

BACKGROUND OF THE INVENTION

1. Field of the Invention

The invention is directed to a precision injection unit for a machine for producing molded articles with a drive device for the rotation of the worm and a drive device for the axial movement of the worm.

2. Description of the Related Art

DE 42 06 966 discloses an injection unit with only one drive motor for the axial and radial movement of the worm. The rotating movement of the worm is carried out by the motor via a belt drive, one belt drive being connected with the worm shaft by a splined shaft section in a positive engagement, but so as to be axially displaceable.

The rear part of the worm shaft is constructed as a ball spindle and engages with the corresponding spindle nut. The ball spindle nut is supported in the frame so as to be rotatable and can be secured by a claw coupling relative to the frame. A spring element constantly presses the ball spindle with the spindle nut axially against the frame.

During the plastifying process for plastic, the coupling is not engaged. During the injection process, the coupling is activated, so that the worm is compelled to move axially when the motor rotates. Only a very slight small axial lift or stroke is achieved in this construction.

Further, it must be viewed as a disadvantage that the worm rotation and the axial position can not be influenced independent from one another.

EP 0 427 866, to which U.S. Pat. No. 5,129,808 corresponds, describes an injection unit with a metering motor and an injection motor which is constructed as a dual-platen injection unit. The injection unit has a fixed platen in which two ball spindles are secured axially and a movable platen with two linear guides which are connected with one another via the ball spindles and associated ball spindle nuts. The metering motor is fastened to the movable platen and drives the worm (in rotation) via a belt drive.

The injection motor is fastened to the fixed platen and drives the two ball spindles via a belt drive for the axial injection movement of the movable platen.

The described injection unit has a complicated mechanical construction and, accordingly, a great many movable elements which results in increased maintenance and wear. Since the injection motor must move very massive parts of the injection unit, the mass moment of inertia is also high and accordingly limits effectiveness and efficiency.

SUMMARY OF THE INVENTION

Proceeding from the problems and disadvantages described above, the object of the invention is to provide an above-average, economically operating and reliable precision injection unit using features which are known in part.

An extremely compact construction of the drive block of the injection unit which is limited to a minimum of parts is achieved by integrating two drive devices for axial movement and worm rotation, wherein it is possible to achieve a temporary flow of force. High efficiency and high availability are achieved in this way.

A drive shaft with a cylindrical connection for the worm coupling is mounted so as to be freely rotatable at the other end along with a splined shaft section in a screw sleeve with two axial load-bearing capability rolling bearings. The splined shaft section of the shaft engages with a complementary axial splined shaft coupling which is connected, via a gear unit, to the servo motor for the rotating movement of the worm.

The screw sleeve, preferably a planetary roll spindle, engages with a complementary spindle nut. The spindle nut is freely rotatable in the housing of the drive block of the injection unit with two axial load-bearing rolling bearings. A servo motor drives the spindle nut by means of a belt drive and, depending on the rotating direction, the screw sleeve and, therefore, also the plastifying worm moves axially in one or the other direction, since the screw sleeve operates as a means for preventing rotation which is guided in a housing groove and therefore prevents the screw sleeve from participating in rotation.

The axial movement (injection/metering or influencing of the pressure profile of the melt) and the rotation of the worm (plastifying) can be carried out completely independent from one another.

The shortest possible flow of force with the smallest mass moment of inertia combined with high efficiency and low maintenance is achieved by means of this construction.

Only the selected construction length of the screw sleeve, and the length of the splined shaft profile coupling which is adapted to it, limits (a drive block) the possible injection stroke of the worm.

An embodiment example of the invention is shown in the drawings and described in the following.

DETAILED DESCRIPTION OF THE PRESENTLY PREFERRED EMBODIMENTS

Figure 1:
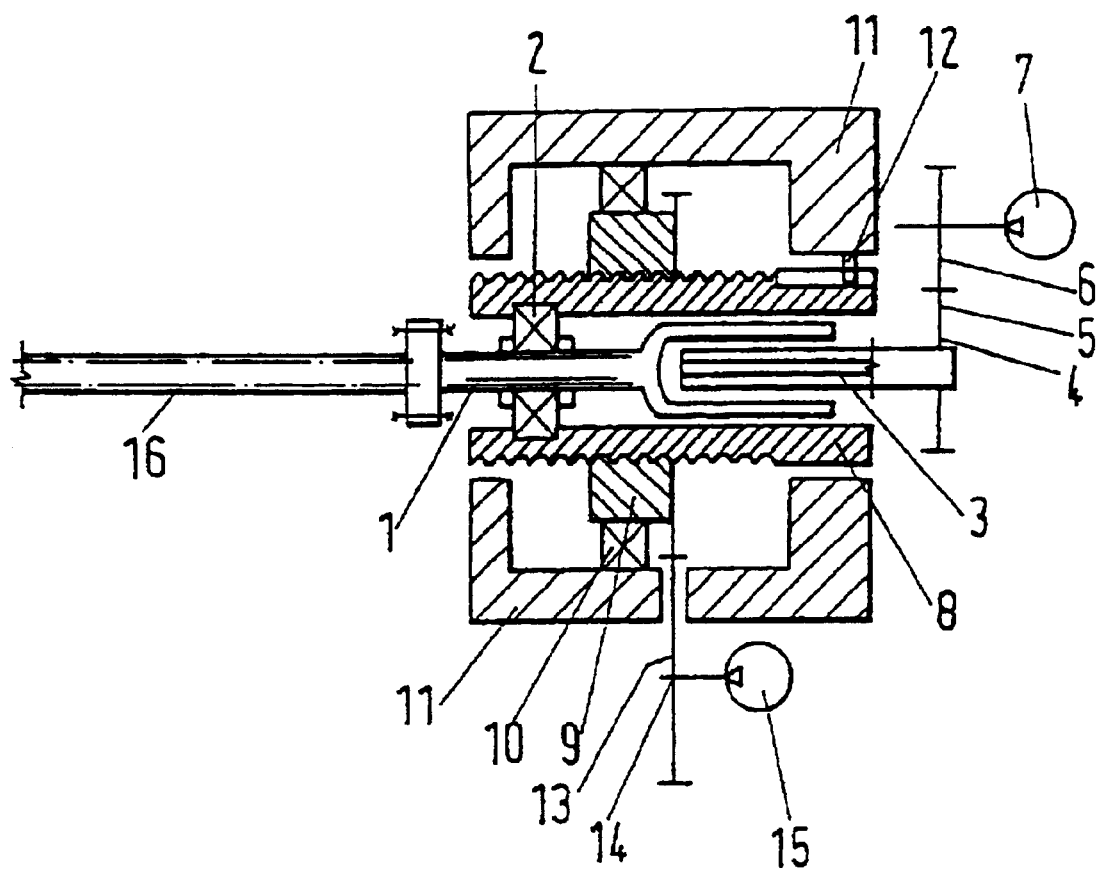
FIG. 1 is a simplified view of the drive block of the injection unit.

The shaft 1 has a cylindrical part 16 for the connection of the worm coupling, not shown, at one end and a splined shaft profile at the other end. The shaft 1 is supported in the screw sleeve 8 by the shaft bearings 2 and can rotate independent from it. The radial forces and the high axial forces occurring particularly during injection are conducted into the screw sleeve 8 by the shaft bearings 2.

The axial splined shaft coupling 3 engages with the splined shaft profile of the shaft 1. The axial splined shaft coupling 3 is fixedly connected with the drive shaft of the gear unit 4 which is screwed to the housing 11. The torque of the electric motor 7 which is also fastened to the housing 11 Is transmitted to the gear unit 4 via the belt drives 5 and 6.

The spindle nut 9 engages with the screw sleeve 8 and is supported in the housing 11 by the spindle nut bearing 10 so as to be rotatable. The high axial forces occurring during the injection are conducted into the housing 11 via the spindle nut bearing 10.

The spindle nut 9 has a flange to which the belt drives 13 and 14 are flanged and the torque can accordingly be transmitted from the electric gear unit motor 15 fastened to the housing 11 and from the belt drive.

The housing 11 has a block 12 which is received in an axially extending groove in the screw sleeve 8 and prevents the screw sleeve 8 from rotating along during rotation of the spindle nut 9 and shaft 1.

When the spindle nut 9 is set in rotation, the screw sleeve 8 must compulsorily move with the shaft 1 in axial direction.

A pressure sensor is provided at a bearing loaded by axial force for direct instantaneous measurement of axial force.

Figure 2:
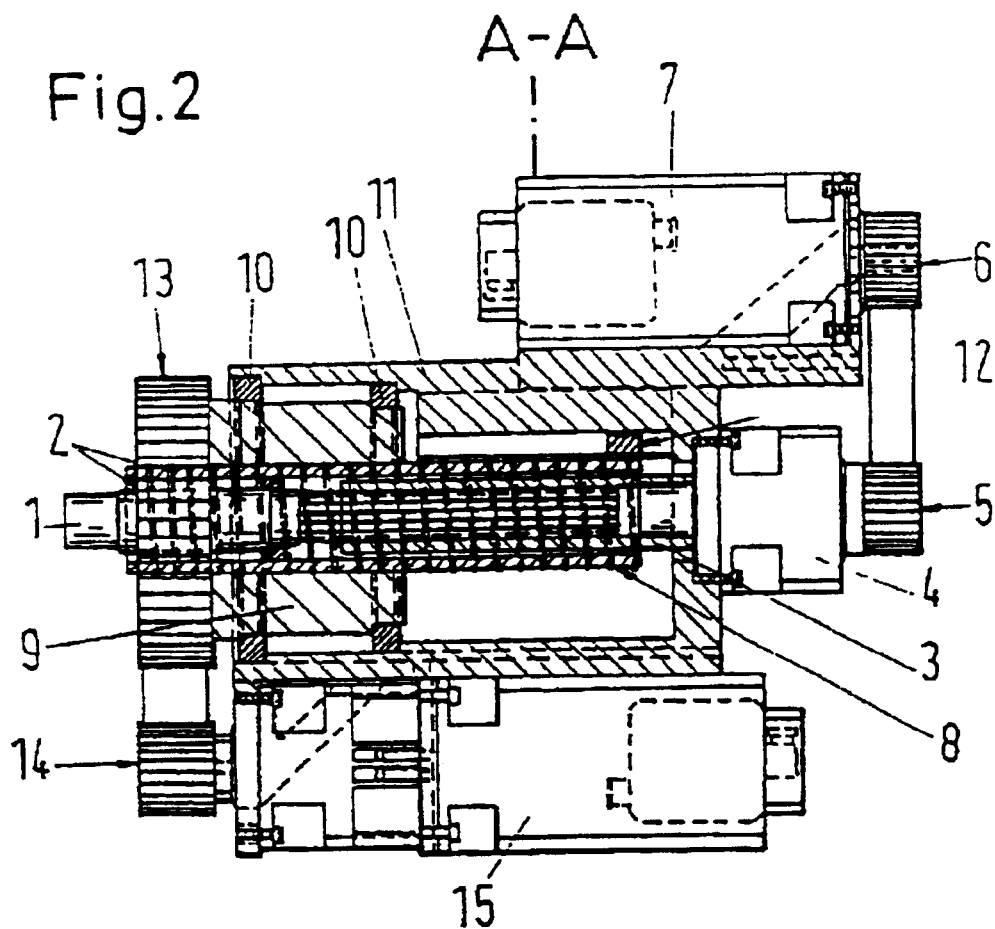
FIG. 2 shows a practical construction.
Figure 3:
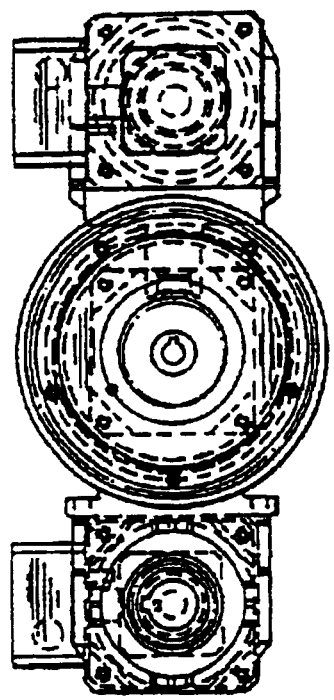
FIG. 3 shows a section along line A—A.

The arrangement and construction of the drive devices and belt drives are shown particularly in the practical construction shown in FIGS. 2 and 3.

I claim:

1. An injection molding apparatus comprising a housing, a screw sleeve which is axially displaceable with respect to said housing, means for preventing rotation of said screw sleeve with respect to said housing, a shaft which is mounted concentrically in said screw sleeve and is axially fixed but rotatable with respect to said screw sleeve, said shaft having one end for carrying a worm in a molding cylinder and an axially opposed end, a spindle nut which cooperates with said screw sleeve to axially displace said screw sleeve with respect to said housing when said spindle nut is rotated, a first drive device for rotating said spindle nut, thereby axially displacing said shaft, an axial coupling on said opposed end which is rotatably fixed but axially displaceable with respect to said opposed end, and a second drive device for rotating said axial coupling, thereby rotating said shaft.

2. An injection molding apparatus as in claim 1 wherein each of said first and second drive devices comprises an electric motor.

3. An injection molding apparatus as in claim 2 wherein each said electric motor is a servo motor.

4. An injection molding apparatus as in claim 1 wherein said opposed end of said shaft is splined.

5. An injection molding apparatus as in claim 1 wherein said screw sleeve is constructed as a ball roll spindle.

* * * * *